United States Patent [19]

Datz-Siegel et al.

[11] Patent Number: 5,777,059

[45] Date of Patent: Jul. 7, 1998

[54] SILICONE COMPOSITIONS AND USES THEREOF

[75] Inventors: Teresa Lynn Datz-Siegel; Kenneth Christopher Fey, both of Midland, Mich.

[73] Assignee: Dow Corning Corporation, Midland, Mich.

[21] Appl. No.: 635,043

[22] Filed: Apr. 19, 1996

[51] Int. Cl.⁶ .................................................. C08G 77/08

[52] U.S. Cl. .................... 528/14; 528/25; 528/22; 528/12; 528/21; 528/23; 252/321; 252/358; 524/863; 524/731; 524/588; 524/506

[58] Field of Search ........................ 524/863, 731, 524/588, 506; 252/321, 358; 528/25, 22, 12, 14, 21, 23

[56] References Cited

U.S. PATENT DOCUMENTS

| | | | |
|---|---|---|---|
| 3,959,175 | 5/1976 | Smith, Jr. et al. | 252/321 |
| 4,639,489 | 1/1987 | Aizawa et al. | 524/588 |
| 4,690,713 | 9/1987 | TErae et al. | 106/287.16 |
| 4,749,740 | 6/1988 | Aizawa et al. | 524/588 |
| 4,831,070 | 5/1989 | McInally et al. | 524/267 |
| 4,978,471 | 12/1990 | Starch | 252/174.15 |
| 4,983,316 | 1/1991 | Starch | 252/174.15 |
| 5,283,004 | 2/1994 | Miura | 252/358 |
| 5,442,010 | 8/1995 | Hauenstein et al. | 524/588 |

FOREIGN PATENT DOCUMENTS

| | | | |
|---|---|---|---|
| 2110523 | 12/1993 | Canada. | |
| 0217501 | 4/1987 | European Pat. Off. | B01D 19/04 |

*Primary Examiner*—Margaret W. Glass
*Attorney, Agent, or Firm*—Timothy J. Troy

[57] ABSTRACT

The present invention relates to a silicone composition prepared by reacting a mixture of (i) a polyisobutylene compound, (ii) a polyorganosiloxane, (iii) a silicon compound, and (iv) a catalytic amount of a catalyst. The compositions of this invention are resistant to phase separation and are useful as foam control compositions in foam producing systems.

20 Claims, No Drawings

SILICONE COMPOSITIONS AND USES THEREOF

BACKGROUND OF THE INVENTION

This invention relates to novel silicone compositions and to uses of these compositions. More particularly, this invention relates to a silicone composition prepared by reacting a mixture comprising a polyisobutylene compound, a polyorganosiloxane, a silicon compound, and a catalytic amount of a catalyst.

Silicone compositions which are prepared by a reaction of several components have been disclosed. For example, Aizawa et al., in U.S. Pat. Nos. 4,639,489 and 4,749,740, teach a method for producing a silicone defoamer composition wherein a complex mixture of polyorganosiloxanes, filler, a resinous siloxane and a catalyst to promote reaction of the other components are heated together at 50° C. to 300° C.

More recently, a method for preparing a composition similar to that described by Aizawa et al., cited supra, was disclosed by Miura in U.S. Pat. No. 5,283,004. In this disclosure, the above mentioned complex silicone mixture additionally contains at least 0.2 weight parts of an organic compound having at least one group selected from —COR, —COOR' or —(OR'')$_n$—, wherein R and R' are hydrogen or a monovalent hydrocarbon group, R'' is a divalent hydrocarbon group having 2 to 6 carbon atoms and the average value of n is greater than one. It is further disclosed that all the ingredients, including a catalyst, must be reacted at elevated temperatures to obtain the desired antifoam agent.

John et al., in European Patent Application No. 217,501, published Apr. 8, 1987, discloses a foam control composition which gives improved performance in high foaming detergent compositions which comprises (A) a liquid siloxane having a viscosity at 25° C. of at least 7×10$^{-3}$ m$^2$/s and which was obtained by mixing and heating a triorganosiloxane-endblocked polydiorganosiloxane, a polydiorganosiloxane having at least one terminal silanol group and an organosiloxane resin, comprising monovalent and tetravalent siloxy units and having at least one silanol group per molecule, and (B) a finely divided filler having its surface made hydrophobic. John et al. further describes a method for making the foam control compositions and detergent compositions containing said foam control compositions.

Starch, in U.S. Pat. No. 4,983,316 discloses a dispersible antifoam composition for providing controlled foaming liquid laundry detergent formulations and wherein there is provided a non-aqueous emulsion of primary and secondary silicone antifoam agents, at least one nonionic silicone surfactant for emulsifying the primary and secondary antifoaming agents in a solvent, a first organic surfactant dispersing agent for assisting in dispersing the emulsified primary and secondary antifoaming agents in the liquid laundry detergents, and a second dispersing agent of a nonionic difunctional block-copolymer terminating in primary hydroxyl groups for further assisting in dispersing the emulsified primary and secondary antifoam agents in the liquid laundry detergent. A liquid laundry detergent composition containing the composition described immediately above is also disclosed. Starch, in U.S. Pat. No. 4,978,471 discloses a composition which contains essentially the same components as in the '316 patent, however in the '471 patent the secondary antifoam agent is a blend of a polydimethylsiloxane substituted with polar groups and a polydimethylsiloxane fluid.

Terae et al., in U.S. Pat. No. 4,690,713, discloses an antifoam composition comprising (a) 100 parts by weight of a hydrocarbon oil, such as a spindle oil or silicone fluid (e.g. a polydimethylsiloxane fluid having a viscosity of 20 to 1,000,000 centistokes at 25° C., (b) 0.1 to 40 parts by weight of an organosilane compound having 1 to 3 hydroxy groups or hydrolyzable groups (such as alkoxy, acyloxy, and alkenyloxy groups), (c) 1 to 40 parts by weight of a finely divided silica powder and optionally a catalyst.

Silicone compositions which contain polybutylene or polyisobutylene compounds have also been disclosed. For example, Smith et al. in U.S. Pat. No. 3,959,175 discloses a defoamer based on a mixture of polyisobutylene and a high melting point hydrophobic component such as a fatty amide, fatty acid, or triglyceride, a mixture of the polyisobutylene and a hydrophobic material such as treated silica powder, or a combination of the two mixtures.

Canadian Patent Publication No. 2110523 discloses a defoaming composition which is prepared by heating a mixture of polyalphaolefin such as polybutene or polyisobutylene, diethylene triamine, polydimethylsiloxanediol, and silica, adding ethylene-bis-stearamide, and then adding that mixture to a mixture of polyalphaolefin, polydimethylsiloxane, polyether-modified polysiloxane, and polypropylene glycol.

Hauenstein et al. in U.S. Pat. No. 5,442,010 discloses an antifoam composition comprising a polydimethylsiloxane having a viscosity of greater than about 2 mm$^2$/s at 25° C. and a polyisobutylene oligomer having a number average molecular weight of about 200 to about 3,000 and having at least one end terminated with an epoxy-containing group.

SUMMARY OF THE INVENTION

It has now been discovered that polyisobutylene compounds are useful in making silicone compositions.

It is an object of the present invention to prepare silicone compositions which can be advantageously utilized in a variety of applications, including the control of foam in foam producing systems.

It is a further object of the present invention to provide silicone compositions wherein there is provided improvement in the control of foaming behavior.

It is another object of this invention to provide a silicone composition which is stable, resistant to phase separation, and is easily dispersible into a variety of media.

DETAILED DESCRIPTION OF THE INVENTION

The present invention relates to a silicone composition prepared by reacting at a temperature of 25° C. to 300° C. a mixture comprising: (i) 1 to 100 parts by weight of a polyisobutylene compound; (ii) 5 to 100 parts by weight of a polyorganosiloxane having a viscosity of 200 to about 100 million mm$^2$/s at 25° C. expressed by the general formula $R^1_a(R^2O)_b SiO_{(4-a-b)/2}$ in which $R^1$ is a monovalent hydrocarbon or halogenated hydrocarbon group having 1 to 10 carbon atoms, $R^2$ is hydrogen or a monovalent hydrocarbon group having 1 to 10 carbon atoms, a has an average value of 1.9 to 2.2 and b has a sufficiently large value to give at least one —OR$^2$ group in each molecule, at least one such —OR$^2$ group being present at the end of the molecular chain; (iii) 0.5 to 20 parts by weight of at least one silicon compound selected from (a) an organosilicon compound of the general formula $R^3_c SiX_{4-c}$ in which $R^3$ is a monovalent hydrocarbon group having 1 to 5 carbon atoms, X is selected from a halogen atom or a hydrolyzable group and c has an average value of one or less, (b) a partially hydrolyzed condensate of said compound (a), (c) a siloxane resin comprising $(CH_3)_3SiO_{1/2}$ units and $SiO_{4/2}$ units wherein the ratio of $(CH_3)_3SiO_{1/2}$ units to $SiO_{4/2}$ units is 0.4:1 to 1.2:1, or (d) a condensate of said compound (c) with said compound (a) or (b); and (iv) a catalytic amount of a catalyst.

The silicone compositions of this invention are prepared by reacting a mixture of (i) a polyisobutylene compound, (ii) a polyorganosiloxane, (iii) a silicon compound, and (iv) a catalytic amount of a catalyst.

Component (i) is a polyisobutylene compound. The compound may be a polyisobutylene polymer or a polyisobutylene oligomer. Such oligomers or polymers are known in the art and many are available commercially in a variety of molecular weights and endgroup combinations. Component (i) of the invention is preferably a polyisobutylene compound having a number average molecular weight ($M_n$) of about 150 to about 6,000, preferably about 200 to about 3,000, more preferably about 200 to about 2,500, and most preferably about 200 to about 400. The polyisobutylene compound may have fully saturated end groups or it may have at least one terminal group which contain a functional group such as epoxy, methylpropenyl, halide, alkoxyphenylene, hydroxyl, carboxyl, chlorosilyl, vinyl, succinic anhydride, isocyanato, amino or amido. The polyisobutylene compound preferably has fully saturated endgroups, where the endgroup is, for example, an alkyl group, or has at least one terminal group which contains an unsaturated group. Preferred polyisobutylene compounds for component (i) have either two fully saturated end groups or have one vinyl or methylpropenyl end group and one saturated end group. Preferably the end group is independently selected from —$C(CH_3)_3$, —$CH_2C(CH_3)_2H$, —CH=$C(CH_3)_2$ (2-methylpropenyl), or —CH=$CH_2$ (vinyl).

The above mentioned polyisobutylenes are available commercially in a variety of molecular weights from the Amoco Chemical Company (Chicago, Ill.) under the trade name Indopol™, or from the Polyesther Corporation (Southhampton, N.Y.) under the trade name Polysynlane™.

Component (ii) is a polyorganosiloxane comprising siloxane units of the general formula $R^1_a(R^2O)_bSiO_{(4-a-b)/2}$ and having a viscosity of 200 to 100 million centistokes at 25° C. wherein $R^1$ is independently selected from the monovalent hydrocarbon or halogenated hydrocarbon groups having from 1 to 10 carbon atoms, $R^2$ is a hydrogen atom or $R^1$, and the —$OR^2$ group is present at least at the end of a molecular chain of the polyorganosiloxane. The value of a is between 1.9 to 2.2 and b has a value so as to provide at least one —$OR^2$ group per molecule. It is particularly preferred that polyorganosiloxane (ii) is a hydroxyl-terminated polydimethylsiloxane having a viscosity of about 1,000 to 50,000 mm²/s at 25° C.

Component (iii) is at least one silicon compound selected from (a) to (d): (a) an organosilicon compound of the general formula $R^3_cSiX_{4-c}$ wherein $R^3$ is a monovalent hydrocarbon group having one to five carbon atoms, X is a halogen atom or a hydrolyzable group, such as —$OR^4$ or —$OR^5OR^6$, in which $R^5$ is a divalent hydrocarbon group having one to five carbon atoms and $R^4$ and $R^6$ are each selected from a hydrogen atom or a monovalent hydrocarbon group having one to five carbon atoms, the average value of c not exceeding 1, (b) a partially hydrolyzed condensate of the compound (a), (c) a siloxane resin comprising $(CH_3)_3SiO_{1/2}$ and $SiO_2$ units and having a $(CH_3)_3SiO_{1/2}/SiO_2$ ratio of 0.4/1 to 1.2/1,or (d) a condensate of the siloxane resin (c) with the compound (a) or (b). It is preferred that component (iii) is selected from either an alkyl polysilicate wherein the alkyl group has one to five carbon atoms, such as methyl polysilicate, ethyl polysilicate and propyl polysilicate, or the siloxane resin (c). Most preferably, component (iii) is either ethyl polysilicate or a siloxane resin copolymer comprising $(CH_3)_3SiO_{1/2}$ units and $SiO_2$ units in a molar ratio of approximately 0.4:1 to 1.2:1.

Component (iv) is a catalyst. Any compounds which promote condensation reactions or rearrangement/ condensation reactions are suitable as component (iv). It is preferably selected from siloxane equilibration catalysts, silanol-condensing catalysts, or a combination thereof. Catalysts suitable as component (iv) are exemplified by alkali metal hydroxides such as potassium hydroxide, sodium hydroxide, or cesium hydroxide, alkali metal silanolates such as potassium silanolate, alkali metal alkoxides such as potassium isopropoxide or potassium ethoxide, quaternary ammonium hydroxides such as beta-hydroxyethyltrimethyl ammonium hydroxide, benzyltrimethyl ammonium hydroxide, and tetramethyl ammonium hydroxide, quaternary ammonium silanolates, quaternary phosphonium hydroxides such as tetrabutyl phosphonium hydroxide and tetraethylphosphonium hydroxide, quaternary phosphonium silanolates, metal salts of organic acids such as dibutyltin dilaurate, stannous acetate, stannous octanoate, lead napthenate, zinc octanoate, iron 2-ethylhexoate, and cobalt naphthenate, mineral acids such as sulfuric or hydrochloric acid, organic acids such as acetic acid or organosulfonic acids, and ammonium compounds such as ammonium carbonate or ammonium hydroxide. It is preferred that the catalyst is selected from potassium silanolate, potassium hydroxide, or sodium hydroxide.

The mixture can further comprise up to 30 parts by weight of component (v) a finely divided filler. The finely divided filler is exemplified by fumed, precipitated, or plasmatic $TiO_2$, $Al_2O_3$, $Al_2O_3/SiO_2$, $ZrO_2/SiO_2$, and $SiO_2$. The finely divided filler can be hydrophilic or hydrophobic. The filler can be hydrophobed during manufacture (i.e. in-situ) or independently. Various grades of silica having a particle size of several millimicrons to several microns and a specific surface area of about 50 to 1000 m²/g are commercially available and suitable for use as component (v).

The mixture can further comprise up to 20 parts by weight of component (vi), a polyorganosiloxane comprising siloxane units of the general formula $R^7_d(R^8O)_eSiO_{(4-d-e)/2}$ and having a viscosity of 5 to 200 mm²/s at 25° C. wherein $R^7$ is a monovalent hydrocarbon or halogenated hydrocarbon group having one to ten carbon atoms and $R^8$ is hydrogen or a monovalent hydrocarbon group having one to ten carbon atoms. The value of d is between 1.9 and 2.2 and e has a value so as to provide two or more —$OR^8$ groups in each molecule. It is particularly preferred that component (vi) is a hydroxyl-terminated polydimethylsiloxane having a viscosity of about 10 to 100 mm²/s at 25° C. It is preferred that component (vi) is added when filler (v) is a hydrophilic silica.

A mixture of components (i), (ii), (iii), and (iv), and optionally components (v) and/or (vi), is reacted at room temperature or under heat to produce the silicone compositions of this invention, the proportions of the various components being: Component (i)—1 to 100 parts by weight preferably 40–70 parts by weight; Component (ii)—5 to 100 parts by weight; Component (iii)—0.5 to 20, preferably 1 to 7, parts by weight; Component (iv)—A catalytic amount (usually in the range of 0.03 to 1 part by weight); Component (v), if present, —from greater than 0 to 30, preferably 1 to 15, and highly preferred is 5 to 15 parts by weight; Component (vi), if present, —from greater than 0 to 20, preferably 1 to 10, parts by weight.

The silicone compositions of this invention are prepared by simply mixing components (i), (ii), (iii), and (iv), and any optional components at room temperature (about 25° C.) or heating this blend to about 110° to 120° C. Finely divided filler (v), if desired, is then uniformly mixed in using an appropriate dispersing device, such as a homomixer, colloid mill or triple roll mill. The resulting mixture, if heated, is heated to a temperature of 50° C. to 300° C., preferably 100° C. to 300° C., and reacted for one to eight hours, although the reaction time varies depending on the temperature. If component (vi) is to be employed in the composition, it is generally added after the filler (v). It is preferable to carry out all mixing and heating operations in an inert gas atmosphere in order to avoid any danger and to remove volatile matter (unreacted matter, by-products, etc.). The mixing order of the components and the heating temperature and time as hereinabove stated are not believed critical, but can be changed as required. It is further preferred that, after reaction, the catalyst is neutralized to further stabilize the composition.

Alternatively, the silicone composition preferably comprises a polyisobutylene compound, a polyorganosiloxane, and a silicon compound, and a catalyst, this combination optionally containing a filler such as silica.

A highly preferred silicone composition is a homogeneous blend of a hydroxyl-terminated polydimethylsiloxane, a polyisobutylene oligomer having a number average molecular weight ($M_n$) of 200 to 400, an alkyl polysilicate wherein the alkyl group has one to five carbon atoms, such as methyl polysilicate, ethyl polysilicate and propyl polysilicate, and a potassium silanolate or potassium hydroxide catalyst reacted at a temperature of 25° to 300° C.

The silicone composition of this invention may be used as it is, or in the form of a solution obtained by a dispersion in an appropriate solvent or an emulsion obtained by a known emulsifying method.

The present invention also relates to a process for controlling foam in a foaming system wherein the above-described silicone compositions may simply be added to the foaming or foam-producing system, in an amount sufficient to reduce foaming, as determined by routine experimentation. Typically, the silicone compositions of the present invention are added at a concentration of about 0.001 to 0.1 parts by weight based on the weight of the foaming system, however the skilled artisan will readily determine optimum concentrations after a few routine experiments. The method of addition is not critical, and the composition may be metered in or added by any of the techniques known in the art. Examples of foaming systems contemplated herein include media encountered in the production of phosphoric acid and in sulphite or sulphate process pulping operations, bauxite digestion medium in the production of aluminum, metal working fluids, paper manufacture, detergent systems, hydrocarbon-based systems, etc. The compositions of the present invention can be used as any kind of foam control composition, i.e. as defoaming compositions and/or anti-foaming compositions. Defoaming compositions are generally considered as foam reducers whereas antifoaming compositions are generally considered as foam preventors. The compositions of the present invention find utility as foam control compositions in various media such as inks, coatings, paints, detergents, pulp and paper manufacture, textile dyes, and hydrocarbon containing fluids.

EXAMPLES

All parts and percentages in the examples are on a weight basis unless indicated to the contrary. PIB as used hereinbelow denotes polyisobutylene. All viscosities were measured on a Brookfield Viscometer. The number average molecular weight of the compounds was measured by gel permeation chromatography. The following materials were employed in the preparation of the silicone compositions:

PIB A=Polysynlane™, described as a saturated polyisobutylene having a number average molecular weight of about 380, having one terminal group of the formula

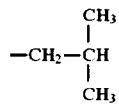

the other terminal group being of the formula —C(CH$_3$)$_3$. It is a product of Polyesther Corporation, Southhampton, N.Y.

PIB B=Indopol™ L-14, described as a vinyl-terminated polyisobutylene having a number average molecular weight of about 370, a viscosity of about 60 millipascal-seconds and a product of the Amoco Chemical Company, Chicago, Ill. One terminal group of this oligomer has the vinyl-like structure (2-methylpropenyl) —HC=C(CH$_3$)$_2$, the other terminal group having the formula —C(CH$_3$)$_3$ PIB C=Indopol™ L-50, similar to PIB B, but having a number average molecular weight of about 455.

PIB D=Indopol™ L-100, similar to PIB B, but having a number average molecular weight of about 510.

Example 1

Into a 500 cc. glass reactor equipped with an electric stirrer and a nitrogen blanket was loaded 55 parts of PIB B, 39 parts of a hydroxy end-blocked polydimethylsiloxane fluid having a viscosity of about 12,500 millipascal-seconds, and 5.9 parts of a polyethyl silicate. These were mixed until homogeneous. The mixture was then catalyzed with ethanolic KOH ( to total 40 ppm K+) and the resulting reaction was allowed to run until evidence of viscosity increase was observed. The reaction product was then neutralized with a combination of calcium carbonate and dry ice.

The reaction product was a cloudy, yellowish, homogeneous liquid which under microscopic evaluation was found to be a fine emulsion of two discrete phases. Despite being composed of two discrete phases, this material remained stable in that no phase separation is observed. The viscosity of the reaction product was estimated to be 9700 millipascal-seconds although it was moderately thixotropic.

Example 2

Into a 500 cc. glass reactor equipped with an electric stirrer and a nitrogen blanket was loaded 55 parts of PIB C, 39 parts of a hydroxy end-blocked polydimethylsiloxane fluid having a viscosity of about 12,500 millipascal-seconds, and 5.9 parts of polyethyl silicate. These were mixed until homogeneous. The mixture was then catalyzed with ethanolic KOH (to total 40 ppm K+) and the resulting reaction was allowed to run until evidence of viscosity increase was observed. The reaction product was then neutralized with a combination of calcium carbonate and dry ice.

The reaction product was a cloudy, white, homogeneous liquid which under microscopic evaluation was found to be a fine emulsion of two discrete phases. This material separated into two discrete liquid phases over a period of less than 24 hours.

Example 3

Into a 500 cc. glass reactor equipped with an electric stirrer and a nitrogen blanket was loaded 55 parts of PIB D. 39 parts of a hydroxy end-blocked polydimethylsiloxane fluid having a viscosity of about 4500 millipascal-seconds. and 5.9 parts of a polyethyl silicate. These were mixed until homogeneous. The mixture was then catalyzed with ethanolic KOH (to total 53 ppm K+) and the resulting reaction was allowed to run until evidence of viscosity increase was observed. The reaction product was then neutralized with a combination of calcium carbonate and dry ice.

The reaction product was a cloudy, yellowish, homogeneous liquid which under microscopic evaluation was found to be a fine emulsion of two discrete phases. This material separated into two discrete liquid phases over a period of several days.

Example 4

Into a 500 cc. glass reactor equipped with an electric stirrer and a nitrogen blanket was loaded 55 parts of PIB A. 39 parts of a hydroxy end-blocked polydimethylsiloxane fluid having a viscosity of 12.500 millipascal-seconds. and 5.9 parts of a polyethyl silicate. These were mixed until homogeneous. The mixture was then catalyzed with ethanolic KOH (to total 75 ppm K+) and the resulting reaction was allowed to progress until evidence of viscosity increase was observed. The reaction product was then neutralized with a combination of calcium carbonate and dry ice.

The reaction product was a crystal clear, single-phase fluid. The material has shown no evidence of separation upon sitting at room temperature for >30 days. The viscosity of the mixture was 15,000 millipascal-seconds and exhibited no observable thixotropic nature.

Example 5

Into a 500 cc glass reactor equipped with an electric stirrer and a nitrogen blanket was loaded 30 parts of PIB B. 64 parts of a hydroxy-end-blocked polydimethylsiloxane fluid having a viscosity of 12.500 millipascal-seconds and 6.2 parts of a polyethyl silicate. These were mixed until homogeneous. The mixture was then catalyzed with ethanolic KOH (to total 28 ppm K+) and the resulting reaction was allowed to progress until evidence of viscosity increase was observed. The reaction product was then neutralized with a combination of calcium carbonate and dry ice.

The reaction product was a cloudy, yellowish, homogeneous mixture which when observed under the microscope was a fine emulsion composed of two discrete liquid phases.

Example 6

After several days of exposure to freeze/thaw cycling, the silicone composition of Example 4 had cleared to reveal two distinct liquid phases suspended within one another. A small amount of organic liquid was also observed to have settled as a layer on top of the sample, but this layer was estimated to represent <10–20% of the original PIB charge. Centrifugation of the sample did not result in complete phase separation of the silicone and the PIB into two distinct liquid layers. Rather, the amount of PIB laying on the top of the sample as well as the PIB dispersed within the silicone fluid bulk phase remained unchanged. This suggests continued dispersion of the two components though the relative particle sizes have changed. It was also found that remixing of the freeze/thaw sample returns the mixture to its original state of a homogeneous one phase mixture.

Example 7

Pump Test data using a standard pulp mill black liquor foaming medium was generated to test the effectiveness of the following samples as foam control compositions.

Foam control composition 1 was prepared by mixing 310.96 grams of the silicone composition prepared in Example 4 with 16.37 grams of Sipernat® D-13 hydrophobic silica. The silica was sheared into the silicone composition by using a Silverson® mixer. Then to a 250 ml stainless steel beaker was added 113.98 grams of an aqueous mixture (which contained 3.41 grams of Pegosperse® 1500 (a combination of polyethylene glycol esters of $C_{14}$–$C_{18}$ fatty acids from Lonza, Fairlawn, N.J.) and 8.66 grams of Lonzest® GMS Technical (hydrogenated mono-, di-, and tri-$C_{16}$–$C_{18}$ fatty acid glycerides from Lonza, Fairlawn, N.J.) dispersed in 101.5 grams of water). At 500 RPM using a marine blade agitator, 12.66 grams of the silicone composition-silica mixture was added to the aqueous mixture over a period of 2 minutes. Mixing at 500 RPM continued for a total of 30 minutes additional time.

Foam control composition 2 was the same as composition 1 except that no Sipernat® D-13 was used.

The pump test was run using a recirculating pump arrangement that directs the pulp black liquor (the liquor comprised sodium lignin sulfonate, pentosan sugars, tall oil soaps, sodium carbonate, sodium sulfide and sodium hydroxide dissolved in water with a solids content of about 15% and a pH of 13.5 at 20° C.) into a calibrated column which allows the measurement of foam being generated. Temperature of the liquor was controlled at 177° F. To 400 cc of recirculating pulp liquor was dosed 121 microliters of either composition described above. The results below are compared to a blank test run in which no silicone antifoam was added to the pulp liquor. Foam height as a function of time was then monitored and recorded and the results are shown in Table 1 hereinbelow.

TABLE 1

| Foam Control Composition | Foam Height in the column in (cm) as a function of Time | | |
|---|---|---|---|
| | 15 sec. | 2 min. | 5 min. |
| 1 | 12.5 | 17.5 | 27.0 |
| 2 | 18.5 | 19.5 | 22.0 |
| BLANK | 28 | Test stopped: foam overflowed column | |

Both the compositions of the invention control foam significantly better than the control.

Example 8

Foam control composition 3 was prepared by adding to a 250 ml stainless steel beaker about 89.96 grams of an aqueous mixture (which contained 2.70 grams of Pegosperse® 1500 and 6.84 grams of Lonzest® GMS Technical (both of which are described in Example 6) dispersed in 80.15 grams of water). At 500 RPM using a marine blade agitator, 10.03 grams of the silicone composition prepared in Example 1 was added to the aqueous mixture over a period of 2 minutes. Mixing then continued at 500 RPM for a total of 30 minutes of additional time.

The above foam control composition and a pulp liquor which did not contain a silicone composition of the invention were then subjected to the pump test described in Example 6. The results are shown in TABLE 2 below.

TABLE 2

| Foam Control Composition | Foam Height in the column in (cm) as a function of Time | | |
|---|---|---|---|
| | 15 sec. | 2 min. | 5 min. |
| 3 | 19.0 | 23.0 | Test stopped |
| BLANK | 28 | Test stopped: foam overflowed column | |

The composition of the invention controls foam significantly better than the control.

That which is claimed is:

1. A silicone composition prepared by reacting at a temperature of 25° C. to 300° C. a mixture comprising:

(i) 1 to 100 parts by weight of a polyisobutylene compound;

(ii) 5 to 100 parts by weight of a polyorganosiloxane having a viscosity of 200 to about 100 million $mm^2/s$ at 25° C. expressed by the general formula $R^1_a(R^2O)_bSiO_{(4-a-b)/2}$ in which $R^1$ a monovalent hydrocarbon or halogenated hydrocarbon group having 1 to 10 carbon atoms. $R^2$ is hydrogen or a monovalent hydrocarbon group having 1 to 10 carbon atoms. a has an average value of 1.9 to 2.2 and b has a sufficiently large value to give at least one —$OR^2$ group in each molecule. at least one such —$OR^2$ group being present at the end of the molecular chain;

(iii) 0.5 to 20 parts by weight of at least one silicon compound selected from (a) an organosilicon compound of the general formula $R^3_cSiX_{4-c}$ in which $R^3$ is a monovalent hydrocarbon group having 1 to 5 carbon atoms. X is selected from a halogen atom or a hydrolyzable group and c has an average value of one or less.

(b) a partially hydrolyzed condensate of said compound (a).

(c) a siloxane resin comprising $(CH_3)_3SiO_{1/2}$ units and $SiO_{4/2}$ units wherein the ratio of $(CH_3)_3SiO_{1/2}$ units to $SiO_{4/2}$ units is 0.4:1 to 1.2:1. or (d) a condensate of said compound (c) with said compound (a) or (b); and (iv) a catalytic amount of a catalyst selected from the group consisting of alkali metal hydroxides. alkali metal silanolates. alkali metal alkoxides. guatemary ammonium hydroxides. quatemary ammonium silanolates. quatemnar phosphonium hydroxides. quatemmry phosphonium silanolates. mineral acids. acetic acid. organosulfonic acids. ammonium carbonate. and ammonium hydroxide.

2. A composition according to claim 1. wherein one end group of said polyisobutylene is a saturated group and another end group is selected from a saturated group or an unsaturated group and said polyisobutylene has a number average molecular weight of about 200 to about 400.

3. A composition according to claim 2. wherein the saturated endgroup is independently selected from —$C(CH_3)_3$ or —$CH_2C(CH_3)_2H$ and the unsaturated endgroup is independently selected from —$CH=C(CH_3)_2$ or —$CH=CH_2$.

4. A composition according to claim 1. wherein polyorganosiloxane (ii) is a hydroxyl-terminated polydimethylsiloxane having a viscosity of about 1.000 to 50.000 $mm^2/s$ at 25° C.

5. A composition according to claim 1. wherein silicon compound (iii) is selected from ethyl polysilicate or a siloxane resin copolymer comprising $(CH_3)_3SiO_{1/2}$ units and $SiO_2$ units in a molar ratio of approximately 0.4:1 to 1.2:1. respectively.

6. A composition according to claim 1. wherein the catalyst (iv) is selected from the group consisting of alkali metal hydroxides. alkali metal silanolates. alkali metal alkoxides. quaternary ammonium hydroxides. and quaternary ammonium silanolates.

7. A composition according to claim 1. wherein the mixture further comprises up to 30 parts by weight of: (v) at least one finely divided filler.

8. A composition according to claim 7. wherein the finely divided filler (v) is a hydrophobic silica having a surface area of about 50 to 300 $m^2/g$.

9. A composition according to claim 1. wherein the mixture further comprises up to 20 parts by weight of: (vi) a polyorganosiloxane having a viscosity of 5 to 200 $mm^2/s$ at 25° C. and being expressed by the general formula $R^7_d(R^8O)_eSiO_{(4-d-e)/2}$ wherein $R^7$ is a monovalent hydrocarbon or halogenated hydrocarbon group having one to ten carbon atoms. $R^8$ is hydrogen or a monovalent hydrocarbon group having one to ten carbon atoms. d is has a value of 1.9 and 2.2 and e has a value so as to provide at least two —$OR^8$ groups in each molecule.

10. A composition according to claim 7. wherein the mixture further comprises up to 20 parts by weight of: (vi) a polyorganosiloxane having a viscosity of 5 to 200 $mm^2/s$ at 25° C. and being expressed by the general formula $R^7_d(R^8O)_eSiO_{(4-d-e)/2}$ wherein $R^7$ is a monovalent hydrocarbon or halogenated hydrocarbon group having one to ten carbon atoms. $R^8$ is hydrogen or a monovalent hydrocarbon group having one to ten carbon atoms. d is has a value of 1.9 and 2.2 and e has a value so as to provide at least two —$OR^8$ groups in each molecule.

11. A composition according to claim 9. wherein said polyorganosiloxane (vi) is a hydroxyl-terminated polydimethylsiloxane having a viscosity of about 10 to 100 $mm^2/s$ at 25° C.

12. A composition according to claim 10. wherein said polyorganosiloxane (vi) is a hydroxyl-terminated polydimethylsiloxane having a viscosity of about 10 to 100 $mm^2/s$ at 25° C.

13. A method for controlling foam in a foam producing system comprising adding to the foam producing system the composition of claim 1.

14. A method for controlling foam in a foam producing system comprising adding to the foam producing system the composition of claim 2.

15. A method for controlling foam in a foam producing system comprising adding to the foam producing system the composition of claim 6.

16. A method for controlling foam in a foam producing system comprising adding to the foam producing system the composition of claim 7.

17. A method for controlling foam in a foam producing system comprising adding to the foam producing system the composition of claim 9.

18. A method for controlling foam in a foam producing system comprising adding to the foam producing system the composition of claim 10.

19. A method according to claim 13. wherein the foam producing system is selected from inks. coatings. paints. detergents. pulp manufacture. paper manufacture. textile dyes. or hydrocarbon containing fluids.

20. A method according to claim 16. wherein the foam producing system is selected from inks. coatings. paints. detergents. pulp manufacture. paper manufacture. textile dyes. or hydrocarbon containing fluids.

* * * * *